(12) United States Patent
Nakaoki et al.

(10) Patent No.: US 6,922,376 B1
(45) Date of Patent: Jul. 26, 2005

(54) SIL MAGNETO-OPTIC TRANSDUCER HAVING THIN FILM MAGNETIC COIL AND HOLDED MAGNETIC CORE

(75) Inventors: Ariyoshi Nakaoki, Tokyo (JP); Kenji Yamamoto, Tokyo (JP); Akira Kouchiyama, Kanagawa (JP); Akira Suzuki, Kanagawa (JP)

(73) Assignee: Sony Corportion (JP)

( * ) Notice: Subject to any disclaimer, the term of this patent is extended or adjusted under 35 U.S.C. 154(b) by 820 days.

(21) Appl. No.: 09/173,747

(22) Filed: Oct. 16, 1998

(30) Foreign Application Priority Data

| Oct. 17, 1997 | (JP) | P09-285451 |
| Oct. 17, 1997 | (JP) | P09-285452 |
| Oct. 17, 1997 | (JP) | P09-285455 |

(51) Int. Cl.⁷ ............................................. G11B 11/00

(52) U.S. Cl. .................................................. 369/13.33

(58) Field of Search ................. 369/13, 112, 114, 369/59, 112.26, 13.22, 13.23; 360/59, 114

(56) References Cited

U.S. PATENT DOCUMENTS

| 5,105,408 A | * | 4/1992 | Lee et al. ................. 369/44.15 |
| 5,124,961 A | * | 6/1992 | Yamaguchi et al. ..... 369/114 X |
| 5,150,338 A | * | 9/1992 | Birecki et al. ................. 369/13 |
| 5,235,581 A | * | 8/1993 | Miyagawa et al. ....... 369/44.12 |
| 5,293,360 A | | 3/1994 | Hasegawa et al. |
| 5,295,122 A | | 3/1994 | Murakami et al. |
| 5,470,491 A | * | 11/1995 | Kodama et al. ................ 216/22 |
| 5,497,359 A | * | 3/1996 | Mamin et al. ............ 369/44.15 |
| 5,576,098 A | * | 11/1996 | Arimoto et al. ............. 428/332 |
| 5,712,842 A | * | 1/1998 | Yamamoto et al. ..... 369/112.26 |
| 5,784,343 A | * | 7/1998 | Watanabe et al. |
| 5,881,042 A | * | 3/1999 | Knight .................... 369/112 X |
| 5,886,959 A | * | 3/1999 | Bischoff et al. ............... 369/13 |
| 5,903,525 A | * | 5/1999 | McDaniel et al. ............ 369/13 |
| 5,978,320 A | * | 11/1999 | Nakaoki et al. ............... 369/13 |
| 6,044,041 A | * | 3/2000 | Ishizaki et al. ................ 369/13 |

(Continued)

FOREIGN PATENT DOCUMENTS

| EP | 0411783 A2 | 2/1991 |
| EP | 0 492 888 A2 | 7/1992 |
| EP | 0878793 A2 | 11/1998 |
| JP | 02-294903 | 12/1950 |
| JP | 04-074334 | 3/1992 |
| JP | 04-074335 | 3/1992 |
| JP | 04-076844 | 3/1992 |
| JP | 05-325316 | 12/1993 |
| WO | 98/48409 | 10/1998 |
| WO | 98/48418 | 10/1998 |
| WO | 98/49675 | 11/1998 |

OTHER PUBLICATIONS

European Search Report dated Oct. 29, 2001.
Isao Ichimura et al., *High—Density Optical Recording Using A Solid Immersion Lens*, Applied Optics, vol. 36, No. 19, Jul. 1, 1997, pp. 4339–4348.

*Primary Examiner*—Aristotelis M Psitos
(74) *Attorney, Agent, or Firm*—Rader, Fishman & Grauer PLLC; Ronald P. Kananen

(57) ABSTRACT

An optical device is provided which has a light converging unit for converging the light illuminated on a magneto-optical recording layer of an optical recording medium and a magnetic field generating unit provided on the light converging unit towards the optical recording medium. The diameter of the light beam radiated on the magneto-optical recording layer of the optical recording medium is controlled by a light transmitting hole of the magnetic field generating unit. The light beam illuminated on the magneto-optical recording layer of the optical recording medium is not fluctuated in diameter so that it is possible to produce a magnetic field at a low power consumption. In addition, the magnetic field generating unit is not liable to be ruptured. There is also provided a recording and/or reproducing apparatus employing this optical device.

36 Claims, 13 Drawing Sheets

U.S. PATENT DOCUMENTS 6,055,220 A * 4/2000 Mamin et al. .......... 369/112.25
6,064,632 A * 5/2000 Nakaoki et al. ........ 369/114 X
6,069,853 A * 5/2000 Novotny et al. ........ 369/112 X
6,130,779 A * 10/2000 Carlson et al. .............. 369/114
6,243,350 B1 * 6/2001 Knight et al. ................ 369/126

* cited by examiner

SIL MAGNETO-OPTIC TRANSDUCER HAVING THIN FILM MAGNETIC COIL AND HOLDED MAGNETIC CORE

BACKGROUND OF THE INVENTION

1. Field of the Invention

This invention relates to an optical device for photomagnetic recording used in a recording/reproducing apparatus for recording or reproducing information signals for an optical recording medium, such as a magneto-optical disc. The present invention also relates to an optical device and an optical head recording and/or reproducing apparatus employing this optical device.

2. Description of the Related Art

In an optical disc device for recording or reproducing information signals for a magneto-optical disc as a recording medium, there is recently proposed an optical disc device in which an optical system is provided towards the photomagnetic recording layer of the magneto-optical disc to increase the numerical aperture to achieve high density recording and in which the optical system is unified to a magnetic coil to realize the reduced thickness of the device.

This optical disc device uses an optical device 100 having two lenses, shown in FIG. 1, as an objective lens for the optical head.

In the present optical device 100, one of the two lenses towards a magneto-optical disc 101 is a semispherical lens. This lens towards the magneto-optical disc 101 is termed herein as a forward lens 102 and the other lens is termed herein as a backward lens 103. On a spherically-shaped surface 102a of the forward lens 102 is formed a thin film coil 104.

The optical device 100 is configured so that the light radiated from a light source to fall on the optical device 100 is converged by the backward lens 103 and the forward lens 102 to pass through a center hole (light transmitting hole 104a) of the thin film coil 104 so as to be illuminated on the photomagnetic recording layer of the magneto-optical disc 101.

The optical device 100 is also configured so that the thin film coil 104 generates a magnetic field corresponding to recording signals fed from a predetermined device to apply this magnetic field at a position of the photomagnetic recording layer of the magneto-optical disc 101 illuminated by the light.

Meanwhile, the optical device 100, used in the conventional optical disc device, is configured so that the light converged by the backward lens 103 and the forward lens 102 is caused to pass through the center hole (light transmitting hole 104a) of the thin film coil 104 so as to be illuminated on the photomagnetic recording layer of the magneto-optical disc 101.

With the optical device 100, the diameter of the light transmitting hole 104a of the thin film coil 104 is set so that, if a pre-set amount of eccentricity of light from the center axis due to levelling of the optical axis or the assembling error is produced, the light illuminated on the photomagnetic layer of the magneto-optical disc 101 is not kicked by the thin film coil 104.

That is, with this optical device 100, there are occasion s wherein, due to the assembling error or tilt caused during the operation, the optical axis is tilted by approximately 5 mrad at the maximum, as shown in FIG. 2A. Due to this levelling of the optical axis, there are occasions wherein the center of light converged by the backward lens 103 and the forward lens 102 is offset by approximately 20 μm from the center axis of the optical device 100.

Also, in the present optical device 100, there are occasions wherein, due to the assembling error within the assembling tolerance, the center of the light converged by the backward lens 103 and the forward lens 102 is offset by approximately 10 μm from the center axis of the optical device 100.

If the light converged by the backward lens 103 and the forward lens 102 is offset from the center axis of the optical device 100, and the diameter of the light transmitting hole 104a of the thin film coil 104 is small, there are occasions wherein the light is not transmitted optimally through the light transmitting hole 104a of the thin film coil 104 but is partially kicked by the thin film coil 104 to produce variations in diameter.

If the light illuminated on the photomagnetic recording layer of the optical recording medium 101 undergoes variations in the diameter, optimum playback signals or control signals cannot be produced.

Thus, if, with the optical device 100, used in the conventional optical disc device, the light transmitting hole 104a of the thin film coil 104 is increased in diameter, as shown in FIG. 2B, so that, even if a pre-set amount of eccentricity is produced due to the levelling of the optical axis or the assembling error, there will be no risk of the light illuminated on the photomagnetic recording layer of the magneto-optical disc 101 being kicked by the thin film coil 104.

However, if the light transmitting hole 104a of the thin film coil 104 of the optical device 100 is of a larger diameter, an extremely large current needs to be sent to the thin film coil 104 in order to generate a magnetic field required during recording, thus increasing the power consumption. Moreover, heat evolution in the thin film coil 104 is increased to cause rupture of the thin film coil 104.

In addition, in the optical device 100 used in the above-described conventional optical disc device, the forward lens 102 is formed of a glass member having a thermal conductivity as low as approximately 0.55 to 0.75 W/m·K. With the optical device 100, the thin film coil 104 is directly formed on the circular surface 102a of the forward lens 102 formed by the glass member.

Thus, with the present optical device 100, since the thin film coil 104 is in a thermally insulated state, there are occasions wherein the heat evolved in the thin film coil 104 is stored in the thin film coil 104 itself without being transmitted to the forward lens 102.

Even if the forward lens 102 is formed of quartz glass, the heat evolved in the thin film coil cannot be released sufficiently because the thermal conductivity of the quartz glass is of the order of 1.0 to 2.0 W/m·K.

If the thin film coil 104 is in the thermally insulated state, and the heat generated in the thin film coil 104 is stored in the thin film coil 104 itself, the magnetic field generation efficiency from the thin film coil 104 is lowered especially in case of high modulation frequency, while there is also a risk of firing of the thin film coil 104 itself.

In addition, in the optical device 100 used in the above-described conventional optical disc device, the diameter of the light transmitting hole 104a of the coil 104 is desirably set to a smaller value in order to realize high NA and in order to apply the magnetic field to the photomagnetic recording layer of the magneto-optical disc 101 efficiently with small power consumption. It has, however, been difficult with the above-described optical device 100 to reduce the diameter of the light transmitting hole 104a of the coil 104.

That is, the coil 104 of the optical device 100 has a spirally shaped thin-film coil, the outer periphery of which is connected to an electrode used for supplying the driving current to the coil 104 and the inner periphery of which is connected to a lead-out line provided between the thin film coil and the forward lens 102. This lead-out line is connected to the other electrode to supply the driving current to the coil 104.

Thus, in the present optical device 100, the thickness of the coil 104 is equal to the sum of the thickness of the thin film coil and that of the lead-out line.

There is also proposed an optical device having a coil structure in which a thin film coil is of two layers, the outer periphery of the upper layer coil is connected to an electrode, the outer rim of the lower layer coil is connected to the opposite side electrode and in which the inner periphery of the upper layer coil is connected to the inner periphery of the lower layer coil. In this optical device structure, the thickness of the coil structure is the sum of the thicknesses of the upper layer coil and the lower layer coil, such that the thickness of the coil 104 cannot be reduced beyond a certain limit value.

If, in the optical disc device employing this type of the optical device, the coil 104 of the optical device 100 is of a larger thickness, it is necessary to increase the distance d between the surface of the magneto-optical disc 101 and the forward lens 102 shown in FIG. 3.

That is, if the coil 104 is of a larger thickness, the distance between the coil 104 and the magneto-optical disc 101 (working distance WD) needs to be of a certain fixed value in order for the coil 104 not to collide against the surface of the magneto-optical disc 101. Thus, while the distance d between the surface of the magneto-optical disc 101 and the forward lens 102 is increased if the coil 104 is of a larger thickness, the diameter φ of the light transmitting hole 104a of the thin film coil 104 of the optical device 100 needs to be increased in order to realize a large value of NA if the distance d between the surface of the magneto-optical disc 101 and the forward lens 102 is of a large value.

Specifically, the diameter φ of the light transmitting hole 104a of the thin film coil 104 depends on the distance d between the surface of the magneto-optical disc 101 and the forward lens 102, as shown by the following equation (1):

$$\phi \geq 2(t \cdot \tan(\theta 1) + d \cdot \tan(\theta 2)) \quad (1)$$

where θ1 is an angle of incidence of light transmitted through a cover glass 106 provided on a photomagnetic recording layer 105 of the magneto-optical disc 101 and illuminated on the photomagnetic recording layer 105. This angle of incidence θ1 is represented by the following equation (2):

$$\theta 1 = \sin^{-1}(NA/ns) \quad (2)$$

where ns is the refractive index of the cover glass 106. With the optical device 100, the angle of incidence θ1 is set to approximately 34° to realize high NA.

Meanwhile, θ2 is the angle of incidence of light on the cover glass 106. This angle of incidence $O_2$ is expressed by the following equation (3):

$$\theta 2 = \sin^{-1}(NA) \quad (3)$$

In the optical device 100, the angle of incidence θ2 is set to approximately 58° to realize high NA.

Meanwhile, t is the thickness of the cover glass 106 which is set to a preset value to realize high NA.

If, in the optical device 100, the diameter φ of the light transmitting hole 104a of the coil 104 is increased, an extremely large current needs to be supplied to the coil 104, thus increasing the power consumption. Moreover, heat evolution in the coil 104 is increased to cause rupture of the coil 104 from time to time.

SUMMARY OF THE INVENTION

It is therefore an object of the present invention to provide an optical device for photomagnetic recording in which the light illuminated on the photomagnetic recording layer of the optical recording medium is not varied in diameter to generate the magnetic field efficiently with low power consumption without enlarging the light transmitting hole of the magnetic field generating means to suppress rupture of the magnetic field generating means, and a recording and/or reproducing apparatus employing this optical device.

It is another object of the present invention to provide an optical device for photomagnetic recording in which the heat evolved in the thin film coil is effectively released to suppress low efficiency in magnetic field generation and to prevent firing of the thin film coil, and a recording and/or reproducing apparatus employing this optical device.

It is yet another object of the present invention to provide an optical device in which high NA and suppression of coil rupture can be realized and in which a magnetic field can be applied efficiently on the photomagnetic recording layer of the optical recording medium with low power consumption, and a recording and/or reproducing apparatus employing this optical device.

In one aspect, the present invention provides an optical device for photomagnetic recording including light converging means for converging the light illuminated on a photomagnetic recording layer of an optical recording medium, and magnetic field generating means provided on the light converging means for facing the optical recording medium. The magnetic field generating means has a light transmitting center hole for transmitting the light converged by the light converging means, and the diameter of light illuminated on the photomagnetic recording layer of the optical recording medium is controlled by the light transmitting center hole of the magnetic field generating means.

The light incident on the photomagnetic recording optical device is first converged by light converging means. The light converged by the light converging means is transmitted through the light transmitting means of the magnetic field generating means so as to be illuminated on the photomagnetic recording layer of the optical recording medium. The diameter of the light illuminated on the photomagnetic recording layer of the optical recording medium is controlled by the light transmitting hole of the magnetic field generating means to determine the numerical aperture (NA).

During recording, the magnetic field generating means applies the magnetic field of a pre-set strength on an area of the photomagnetic recording layer illuminated by light.

In another aspect, the present invention provides a recording and/or reproducing apparatus including rotationally driving means for rotationally driving an optical recording medium having a photomagnetic recording layer, a light source for radiating the light towards a photomagnetic recording layer of the optical recording medium, an optical device arranged on the optical path of the light radiated from the light source, light receiving means for receiving the light reflected back from the photomagnetic recording medium of the optical recording medium and a signal processing circuit for generating preset signals based on the return light received from the light receiving means. The optical device includes light converging means for converging the light illuminated on a photomagnetic recording layer of an optical recording medium, and magnetic field generating means provided on the light converging means for facing the optical recording medium. The magnetic field generating means has a light transmitting center hole for transmitting the light converged by the light converging means. The diameter of light illuminated on the photomagnetic recording layer of the optical recording medium is controlled by the light transmitting hole of the magnetic field generating means.

In this recording and/or reproducing apparatus, the light emitted by the light source is converged by light converging means of the optical device to traverse the light transmitting hole of the magnetic field generating means so as to be illuminated on the photomagnetic recording layer of the optical recording medium rotationally driven by rotationally driving means. At this time, the diameter of the light illuminated on the photomagnetic recording layer of the optical recording medium is controlled by the light transmitting hole of the optical recording medium to determine the numerical aperture. The magnetic field generating means applies a magnetic field of a preset strength on a site of the photomagnetic recording layer of the optical recording medium illuminated by light to record preset information signals on the optical recording medium.

With the present recording and/or reproducing apparatus, the light radiated from the light source is converged by the light converging means of the optical device during reproduction to traverse the light transmitting hole of the magnetic field generating means layer of the optical recording medium rotationally driven by rotationally driving means. At this time, the diameter of the light illuminated on the photomagnetic recording layer of the optical recording medium is controlled by the light transmitting hole of the optical recording medium to determine the numerical aperture. The return light reflected by the photomagnetic recording medium is received by the light reception and thence supplied to the signal processing circuit to generate playback signals and control signals.

In a further aspect, the present invention provides an optical device for photomagnetic recording including an objective lens for converging the light illuminated on the photomagnetic recording layer of an optical recording medium, a coil supporting substrate formed by a member having a thermal conductivity higher than that of the objective lens, and a thin film coil formed on a surface of the coil supporting substrate facing the optical recording medium. The coil supporting substrate is provided towards the optical recording medium of the objective lens.

In this optical device, the objective lens converges the light to be illuminated on the photomagnetic recording layer of the optical recording medium to illuminate the converged light on the photomagnetic recording layer.

Also, in this optical device, the thin film coil applies the magnetic field of a preset strength during recording on a site of the photomagnetic recording layer. At this time, heat generated in the thin film coil is transmitted to and absorbed by the coil supporting substrate.

In a further aspect, the present invention provides an optical device for photomagnetic recording including a plurality of lenses arranged on an optical path of light illuminated on a photomagnetic recording layer of an optical recording medium, and a thin film coil arranged on a surface of the lens arranged towards the optical recording medium facing the optical recording medium. One of the plural lenses arranged towards the optical recording medium is formed by a member having a thermal conductivity higher than that of the other lenses.

In this optical device, the plural lenses converge the light illuminated on the photomagnetic recording layer of the optical recording medium to illuminate the converged light on the photomagnetic recording medium.

Also, in this optical device, the thin film coil applies the magnetic field of a preset strength during recording on a site of the photomagnetic recording layer. At this time, heat generated in the thin film coil is transmitted to and absorbed by one of the plural lenses arranged towards the optical recording medium.

In a further aspect, the present invention provides a recording and/or reproducing apparatus including rotationally driving means for rotationally driving an optical recording medium having a photomagnetic recording layer, a light source for radiating the light towards a photomagnetic recording layer of the optical recording medium, an optical device arranged on the optical path of the light radiated from the light source, light receiving means for receiving the light reflected back from the photomagnetic recording medium of the optical recording medium, and a signal processing circuit for generating preset signals based on the return light received from the light receiving means. The optical device includes an objective lens for converging the light radiated from the light source, a coil supporting substrate formed by a member having a thermal conductivity higher than that of the objective lens, and a thin film coil formed on a surface of the coil supporting substrate facing the optical recording medium. The coil supporting substrate is formed on the side of the objective lens facing the optical recording medium.

With the present recording and/or reproducing apparatus, the light radiated from the light source is converged during recording by the objective lens of the optical device so as to be illuminated on photomagnetic recording layer of the optical recording medium run in rotation by the rotationally driving means. The thin film coil of the optical device applies a magnetic field of a preset strength on the site of the photomagnetic recording layer of the optical recording medium illuminated by the light to record preset information signals on the optical recording medium.

At this time, heat generated in the thin film coil is transmitted to and absorbed by the coil supporting substrate.

Also, in the present recording and/or reproducing apparatus, the light radiated from the light source is converged by the objective lens of the optical device so as to be illuminated on the photomagnetic recording layer of the optical recording medium run in rotation by the rotationally driving means. The return light reflected from the photomagnetic recording layer of the optical recording medium is received by light reception means and thence supplied to the signal processing circuit to generate preset signals.

In a further aspect, the present invention provides a recording and/or reproducing apparatus including rotationally driving means for rotationally driving an optical recording medium having a photomagnetic recording layer, a light source for radiating the light towards a photomagnetic recording layer of the optical recording medium, an optical device arranged on the optical path of the light radiated from the light source, light receiving means for receiving the light reflected back from the photomagnetic recording medium of the optical recording medium, and a signal processing circuit for generating preset signals based on the return light received from the light receiving means. The optical device includes a plurality of lenses arranged on an optical path of light radiated from the light source, and a thin film coil arranged on a surface of the lens arranged towards the optical recording medium facing the optical recording medium. One of the plural lenses arranged towards the optical recording medium is formed by a member having a thermal conductivity higher than that of the other lenses.

With the present recording and/or reproducing apparatus, the light radiated from the light source is converged during recording by the plural lenses of the optical device so as to be illuminated on photomagnetic recording layer of the optical recording medium run in rotation by the rotationally driving means. The thin film coil of the optical device applies a magnetic field of a preset strength on the site of the photomagnetic recording layer of the optical recording medium illuminated by the light to record preset information signals on the optical recording medium.

At this time, heat generated in the thin film coil is transmitted to and absorbed by that one of the plural lenses that is arranged towards the optical recording medium.

Also, in the present recording and/or reproducing apparatus, the light radiated from the light source is converged by the plural lenses of the optical device so as to be illuminated on the photomagnetic recording layer of the optical recording medium run in rotation by the rotationally driving means. The return light reflected from the photomagnetic recording layer of the optical recording medium is received by light reception means and thence supplied to the signal processing circuit to generate preset signals.

In a further aspect, the present invention provides an optical device for photomagnetic recording including light converging means for converging the light illuminated on a photomagnetic recording layer of an optical recording medium, and magnetic field generating means provided on the side of the light converging means facing the optical recording medium. The magnetic field generating means includes a thin film coil and an electrically conductive magnetic core connected to the thin film coil. A driving current is sent via the magnetic core to the thin film coil to generate a magnetic field of a preset strength.

In this optical device for photomagnetic recording, the light converging means converges the light to illuminate the converged light on the photomagnetic recording layer.

Also, with the present optical device for photomagnetic recording, the driving current is supplied to the thin film coil via the magnetic core so that the magnetic field generating means applies the magnetic field of a preset strength on the illuminated site.

With the present optical device for photomagnetic recording, since the current driving the thin film coil is sent to the thin film coil via magnetic core, there is no necessity of providing a leadout line for supplying the current.

In yet another aspect, the present invention provides recording and/or reproducing apparatus including rotationally driving means for rotationally driving an optical recording medium having a photomagnetic recording layer, a light source for radiating the light towards a photomagnetic recording layer of the optical recording medium, an optical device arranged on the optical path of the light radiated from the light source, light receiving means for receiving the light reflected back from the photomagnetic recording medium of the optical recording medium and a signal processing circuit for generating preset signals based on the return light received from the light receiving means. The optical device includes light converging means for converging the light illuminated on a photomagnetic recording layer of the optical recording medium, and magnetic field generating means provided on the side of the light converging means facing the optical recording medium. The magnetic field generating means includes a thin film coil and an electrically conductive magnetic core connected to the thin film coil. A driving current is supplied through the magnetic core to the thin film coil to generate a magnetic field of a preset strength.

With the present recording and/or reproducing apparatus, the light radiated from the light source during recording is converged by the light converging means of the optical device so as to be illuminated on the photomagnetic recording layer of the optical recording medium run in rotation by the rotationally driving means. By the driving current being supplied to the thin film coil via magnetic core, the magnetic field of a preset strength is applied by the magnetic field generating means on the site of the photomagnetic recording layer illuminated by the light to record preset record information signals on the optical recording medium.

Also, with the present recording and/or reproducing apparatus, the light radiated from the light source during playback is converged by the light converging means so as to be illuminated on the photomagnetic recording layer of the optical recording medium run in rotation by the rotationally driving means. The return light reflected by the photomagnetic recording layer of the optical recording medium is received by the light reception means and thence sent to the signal processing circuit to generate preset signals.

With the present recording and/or reproducing apparatus, since the current driving the thin film coil is supplied via magnetic core to the thin film coil, there is no necessity of providing leadout lines for current supply to the optical device.

Also, with the recording and/or reproducing apparatus of the present invention, since the diameter of the light illuminated on the photomagnetic recording layer of the optical recording medium is limited by the light transmitting hole of the magnetic field generating means, the variation in the diameter of the light can be reduced to approximately the range of allowance, without the necessity of setting the diameter of the light transmitting hole of the magnetic field generating means of the optical device, even if the center of light illuminated on the photomagnetic recording layer of the optical recording medium is offset from the center axis of the optical device due to levelling of the optical axis or the assembling error. Thus, the magnetic field can be generated efficiently by low power consumption to enable appropriate recording as well as to suppress damage, such as rupture, to the magnetic field generating means.

Moreover, with the optical device for photomagnetic recording according to the present invention, the coil supporting substrate having the thin film coil formed thereon is formed by the member of a higher thermal conductivity, any heat generated in the thin film coil is effectively transmitted to the coil supporting substrate without being stored in the thin film coil.

Thus, with the present optical device for photomagnetic recording, the magnetic field generating efficiency is not lowered due to heat in the thin film coil especially at a high modulation frequency, while damages to the thin film coil, such as rupture, may be suppressed.

In addition, with the optical device according to the present invention, the lens arranged on the optical recording medium is constituted by a member of a high thermal conductivity and the thin film coil is not formed on this lens, any heat generated in the thin film coil is effectively transmitted to the lens provided on the optical recording medium without being accumulated in the thin film coil.

Therefore, with the present optical device for photomagnetic recording, the magnetic field generating efficiency is not lowered due to heat in the thin film coil especially at a high modulation frequency, while damages to the thin film coil, such as rupture, may be suppressed.

Also, with the optical device according to the present invention, the lens arranged on the optical recording medium is constituted by a member of a high thermal conductivity and the thin film coil is not formed on this lens, any heat generated in the thin film coil is effectively transmitted to the lens provided on the optical recording medium without being accumulated in the thin film coil.

Thus, with the present optical device, the magnetic field generating efficiency is not lowered due to heat in the thin film coil especially at a high modulation frequency, while damages to the thin film coil, such as rupture, may be suppressed.

Also, with the recording and/or reproducing apparatus according to the present invention, since the lens arranged on the optical recording medium is constituted by a member of a high thermal conductivity, any heat generated in the thin film coil is effectively transmitted to the lens provided on the optical recording medium without being accumulated in the thin film coil.

Thus, with the present recording and/or reproducing apparatus, the magnetic field generating efficiency is not lowered due to heat in the thin film coil especially at a high modulation frequency, and the optimum recoding operation can be realized, while damages to the thin film coil, such as rupture, may be suppressed.

Also, with the recording and/or reproducing apparatus according to the present invention, the lens arranged on the optical recording medium is constituted by a member of a high thermal conductivity and the thin film coil is not formed on this lens, any heat generated in the thin film coil is effectively transmitted to the lens provided on the optical recording medium without being accumulated in the thin film coil.

Thus, with the present recording and/or reproducing apparatus, the magnetic field generating efficiency is not lowered due to heat in the thin film coil especially at a high modulation frequency, and the optimum recoding operation can be realized, while damages to the thin film coil, such as rupture, may be suppressed.

With the optical device for photomagnetic recording according to the present invention, the current driving the thin film coil is sent via magnetic core to the thin film coil, the magnetic field generating means can be reduced in thickness to realize high NA to generate the magnetic field efficiently by low power consumption or to suppress rupture of the thin film coil.

With the recording and/or reproducing apparatus according to the present invention, since the optical device has magnetic field generating means capable of being reduced in thickness, the magnetic field can be generated efficiently with low power consumption and high NA to realize appropriate recording operation as well as to suppress rupture of the thin film coil.

DESCRIPTION OF THE PREFERRED EMBODIMENTS

Figure 1:
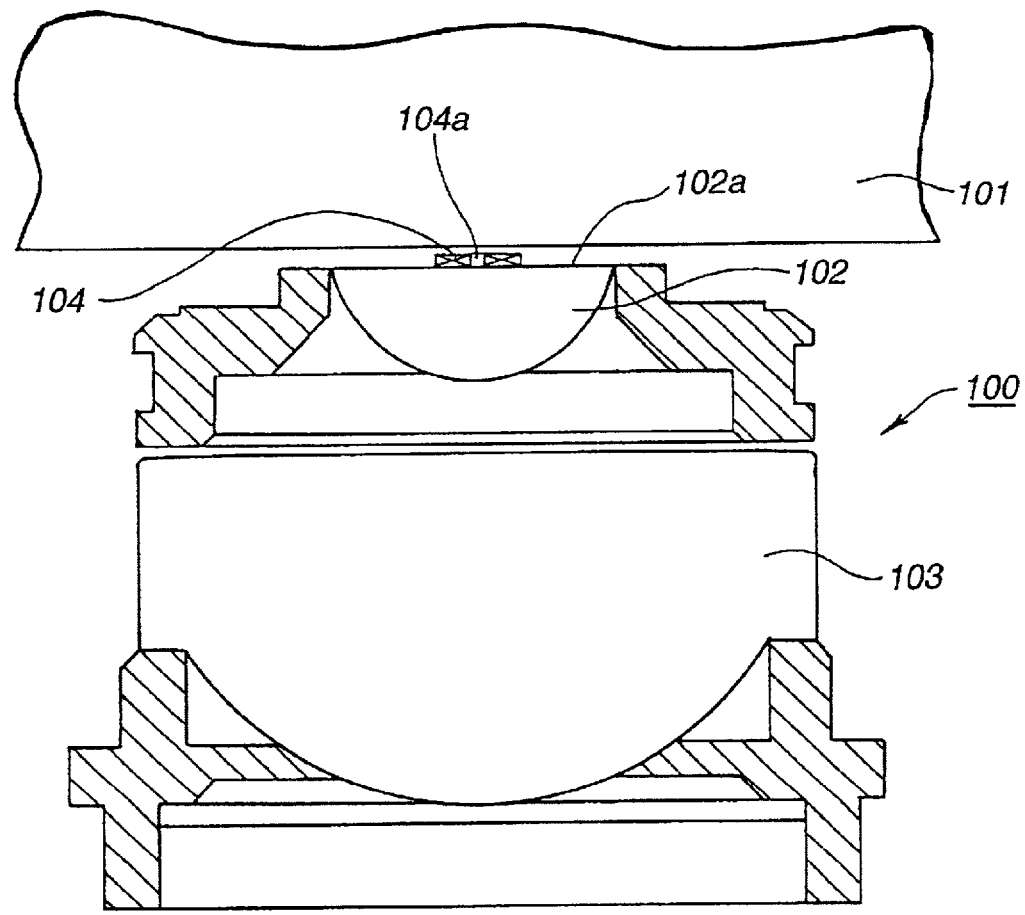
FIG. 1 is a longitudinal cross-sectional view showing a conventional optical device.
Figure 2A:
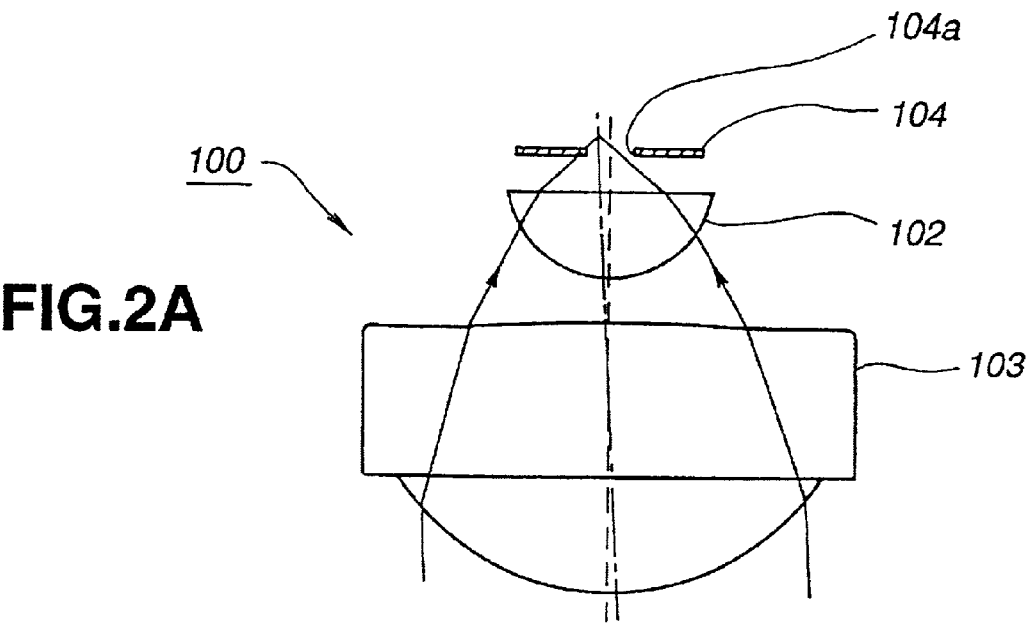
FIGS. 2A is a side view of an optical device having a center hole of a coil of a small diameter and FIG. 2B is a side view of an optical device having a center hole of a coil of a large diameter.
Figure 2B:
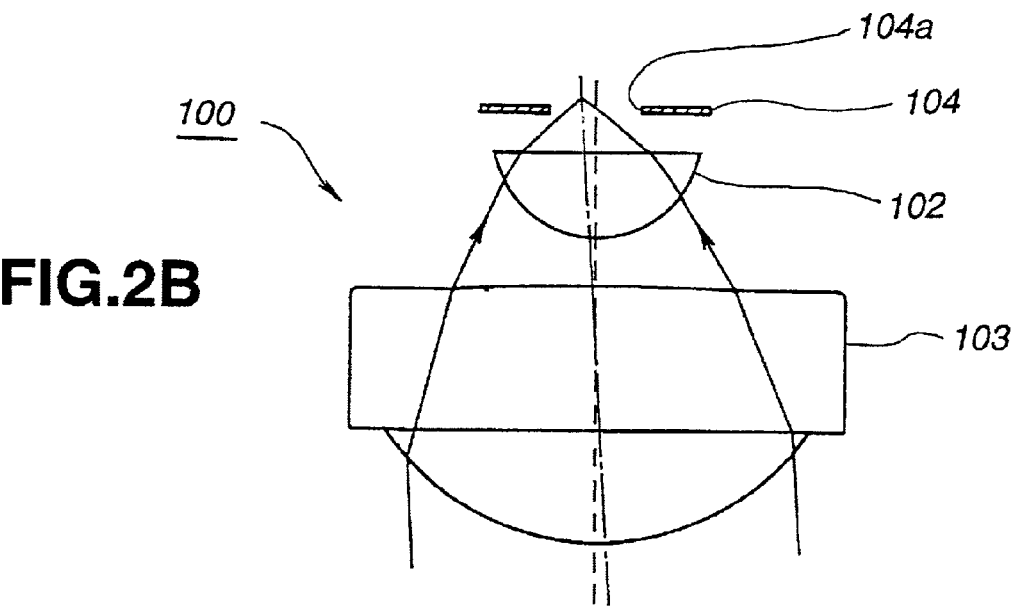
Figure 3:
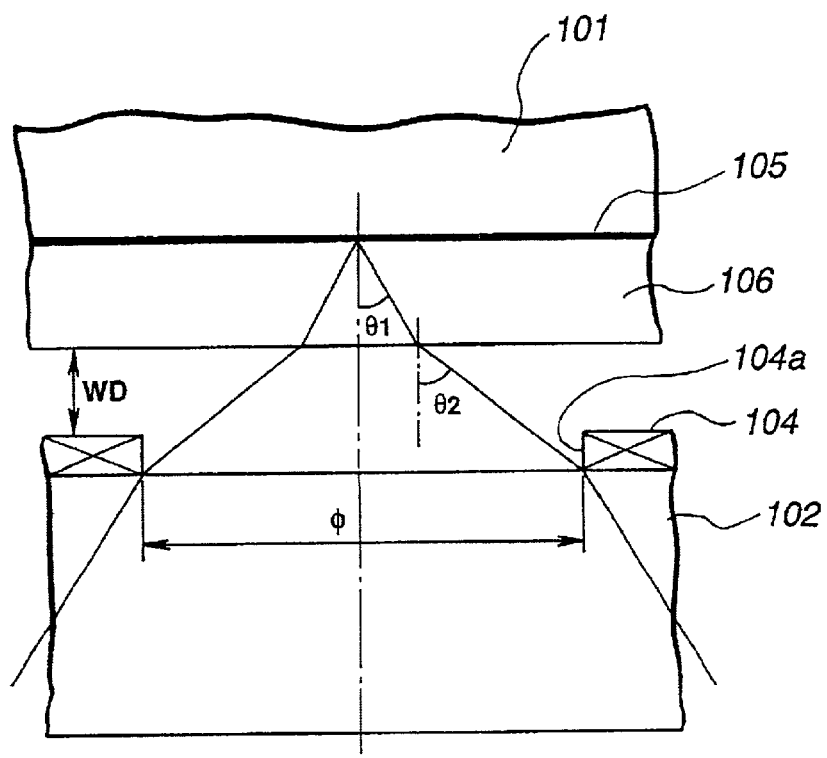
FIG. 3 is a schematic view for illustrating the relation between the thickness of the thin film coil and the diameter of the center hole thereof in the conventional optical device.

Referring to the drawings, preferred embodiments of the present invention will be explained in detail.

Figure 4:
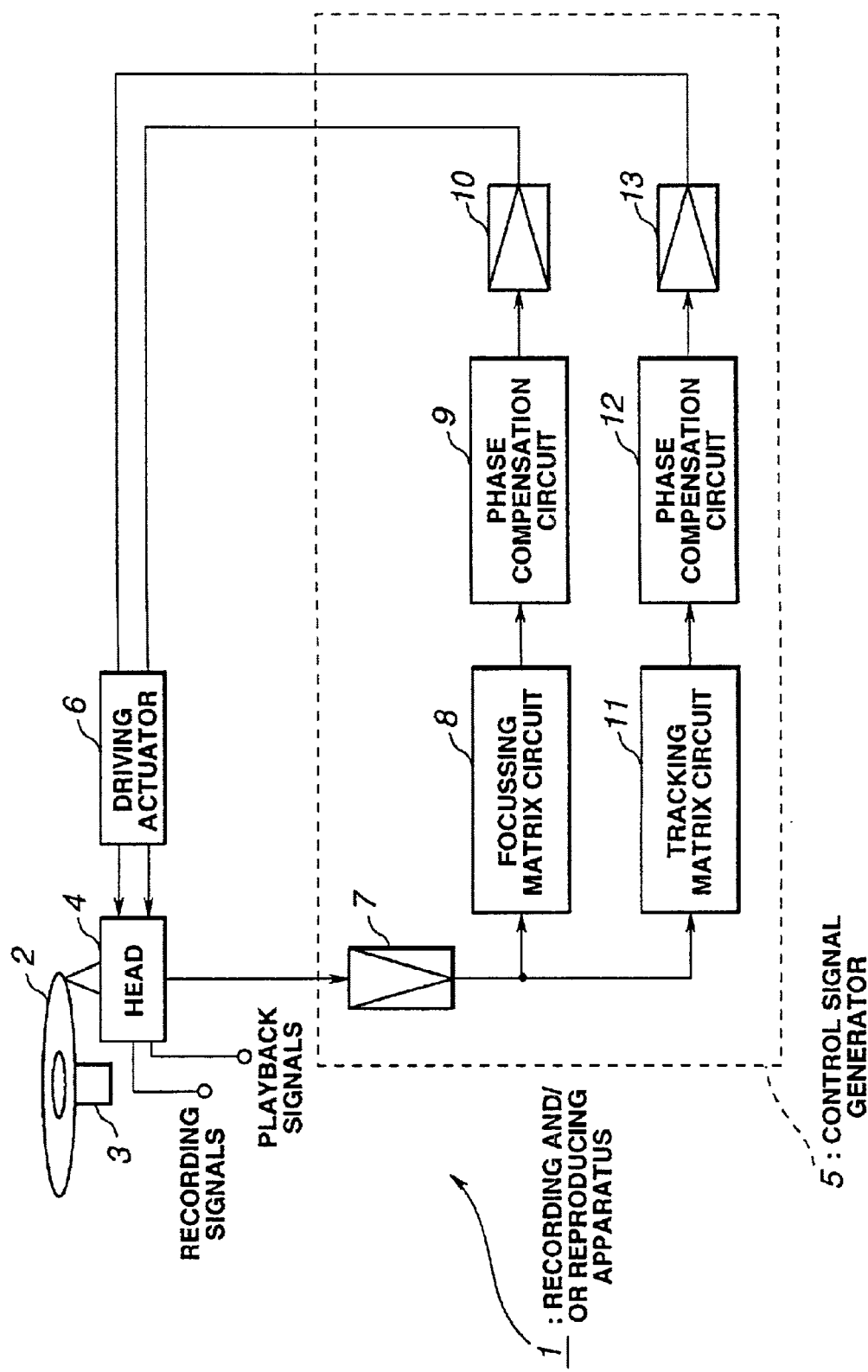
FIG. 4 is a block diagram showing the structure of a recording and/or reproducing apparatus embodying the present invention.

A recording and/or reproducing apparatus according to the present invention, referred to herein as an optical disc device 1, shown in FIG. 4, includes a spindle motor 3 for rotationally driving a magneto-optical disc 2, and a head 4 for recording defined signals on the magneto-optical disc 2, run in rotation by this spindle motor 3, and for outputting light reception signals by reading out signals recorded on the magneto-optical disc 2 to generate magneto-optical playback signals (MO playback signals). The optical disc device 1 also includes a control signal generator 5 for receiving the light reception signal outputted by the head 4 to generate control signals and a driving actuator 6 for causing movement of the head 4 in a radial direction of the magneto-optical disc 2 or in the direction towards and away from the magneto-optical disc 2 based on the control signals supplied from the control signal generator 5.

The spindle motor 3 is connected to a power source, not shown, so that, if fed with the driving current from this power source, the spindle motor 3 runs the magneto-optical disc 2 held thereon at a preset velocity.

When fed with a recording signal from a pre-set device, not shown, the head 4 illuminates light on the photomagnetic recording layer of the magneto-optical disc 2, while generating a magnetic field in meeting with the recording signals to record defined signals at a portion of the photomagnetic recording layer illuminated by the light. The head 4 also illuminates light on the photomagnetic recording layer of the magneto-optical disc 2 to detect return light to read out data recorded on the magneto-optical disc 2 to output the data as MO playback signals. The head 4 also sends the light reception signals to the control signal generator 5.

The control signal generator 5 includes a focussing matrix circuit 8, a tracking matrix circuit 11, phase compensation circuits 9, 12 and amplifiers 7, 10 and 13.

The focussing matrix circuit 8 generates focussing error signals, based on the light reception signals supplied from the head 4 via amplifier 7, to send the focussing error signals to the phase compensation circuit 9.

The phase compensation circuit 9 phase-compensates the focussing error signals sent from the focussing matrix circuit 8 to send the phase-compensated signals via amplifier 10 to the driving actuator 6.

The tracking matrix circuit 11 generates tracking error signals based on the light reception signals sent from the head 4 via amplifier 7 to send the tracking error signals to the phase compensation circuit 12.

The phase compensation circuit 12 phase-compensates the tracking error signals sent from the tracking matrix circuit 11 to send the phase-compensated signals via amplifier 13 to the driving actuator 6.

The driving actuator 6 causes movement of the head 4 in a direction towards and away from the magneto-optical disc 2, based on the focussing error signals sent from the focussing matrix circuit 8 via phase compensation circuit 9 and amplifier 10, by way of performing focussing control. The driving actuator 6 also causes movement of the head 4 in a radial direction of the magneto-optical disc 2, based on the tracking error signals sent from the tracking matrix circuit 11 via phase compensation circuit 12 and amplifier 13, by way of performing tracking control.

The head 4 is hereinafter explained in detail.

Figure 5:
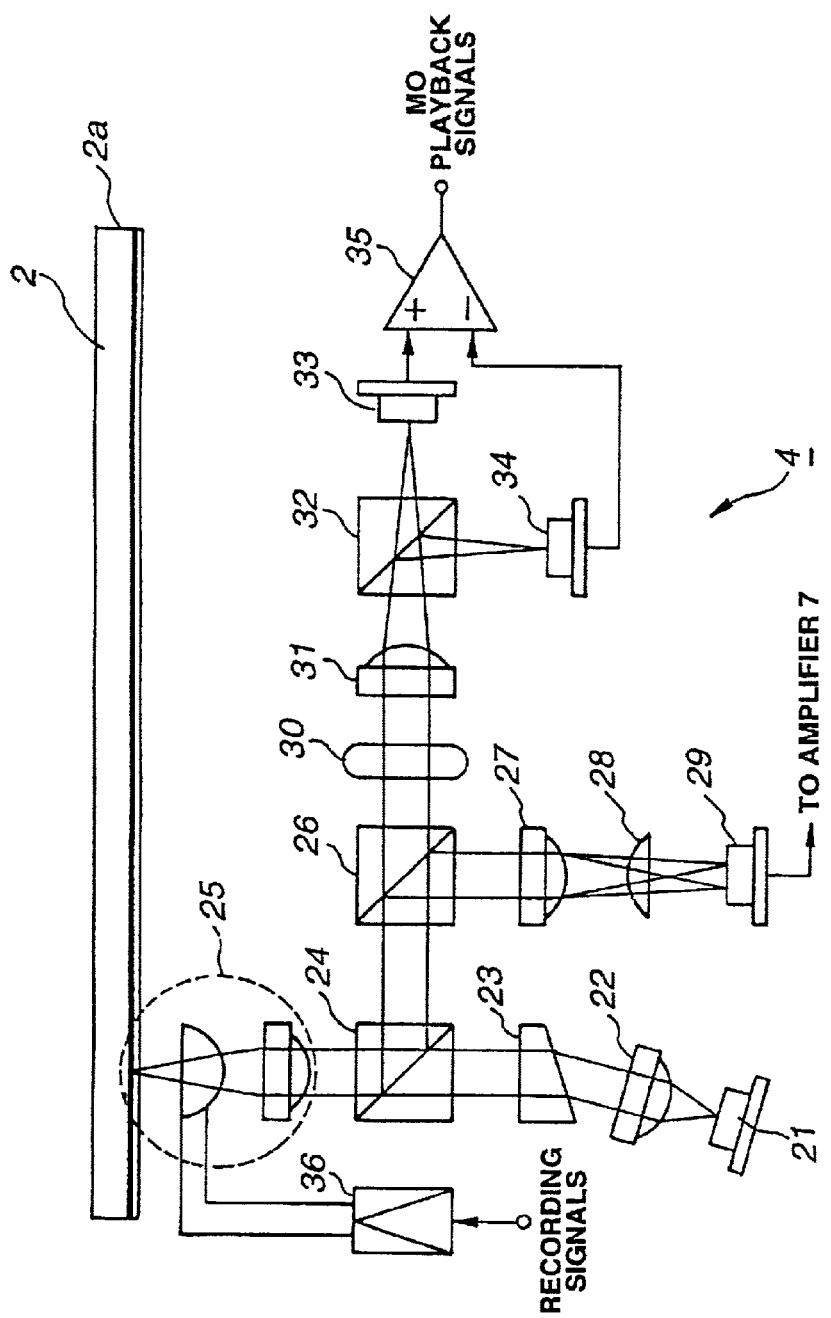
FIG. 5 is a schematic view of a head structure.

Referring to FIG. 5, the head 4 includes a semiconductor laser 21 for radiating the laser light of a predetermined wavelength. The laser light emitted by this semiconductor laser 21 first is incident on a collimator lens 22.

The collimator lens 22 collimates the laser light from the semiconductor laser 21 to a collimated laser light beam which is then incident on a first beam splitter 24 via a shaping prism 23.

The first beam splitter 24 transmits the laser light from the shaping prism 23 to an optical device having a double lens type lens type objective lens and a thin-film coil, while reflecting the laser light reflected from the photomagnetic recording layer 2a of the magneto-optical disc 2 and transmitted through the above optical device towards a second beam splitter 26. This optical device is referred to hereinafter as a magneto-optical head unit 25.

In this magneto-optical head unit 25, the objective lens converges the laser light from the first beam splitter 24 to the photomagnetic recording layer 2a of the magneto-optical disc 2 to illuminate the photomagnetic recording layer 2a. During data recording, the thin-film coil causes a magnetic field of a strength corresponding to recording signals supplied via amplifier 36 to be applied to a laser light illuminating position of the photomagnetic recording layer 2a.

Also, with the magneto-optical head unit 25, the laser light reflected back by the photomagnetic recording layer 2a of the magneto-optical disc 2 is incident on the first beam splitter 24. The return light, incident on the first beam splitter 24, is reflected by the first beam splitter 24 so as to fall on the second beam splitter 26, as explained previously.

The second beam splitter 26 reflects the return light reflected back from the first beam splitter 24 (return light) in a certain proportion towards a first converging lens 27, while transmitting the reflected return light via a half wave plate 30 towards a second converging lens 31.

The first converging lens 27 converges the return light of the collimated light reflected back from the second beam splitter 26 to cause the resulting converged light to fall on a first photodetector 29 via a cylindrical lens 28 adapted to accord astigmatic aberration to the converged light.

The first photodetector 29 has four-segment light receiving sections and is adapted to convert the return light falling on the four segments into electrical signals (light reception signals) which are sent to the amplifier 7 of the control signal generator 5.

The second converging lens 31 converges the return light of the collimated light supplied from the second beam splitter 26 via half wave plate 30 to cause the resulting converged light to fall on a third beam splitter 32.

The third beam splitter 32 transmits part of the return light, converged by the second converging lens 31, towards a second photodetector 33, while reflecting the remaining portion of the return light towards a third photodetector 34.

The third photodetector 33 and the fourth photodetector 34 convert the return light, incident thereon from the third beam splitter 32, into electrical signals corresponding to the light volume, and sends the resulting electrical signals to a differential amplifier 35.

The differential amplifier 35 computes the difference between the electrical signals sent from the second photodetector 33 and those sent from the third photodetector 34 to send the results as MO playback signals to a preset device, not shown.

The optical disc device 1 of the present invention, constructed as described above, is adapted to record or read out preset information signals for the magneto-optical disc 2.

The present optical disc device 1 may also be a phase change disc, exploiting phase changes, or a read-only optical disc, without being limited to the magneto-optical disc. When recording information signals on the phase change optical disc, the optical disc device 1 causes the head 4 to illuminate the laser light on a recording layer of the phase change optical disc to record the information signals by exploiting the phase changes of the recording layer. When reading out the information signals from the phase change optical disc, the optical disc device 1 causes the laser light to be illuminated on the recording layer of the phase change optical disc to derive playback signals based on the difference caused in the return light due to the state of the recording layer.

When reading out information signals from a read-only optical disc, the optical disc device 1 causes the head 4 to illuminate the laser light on a signal recording layer of the read-only optical disc to detect the return light to produce playback signals.

The magneto-optical head unit 25 of the head 4, which represents essential portions of the present invention, is explained.

Figure 6:
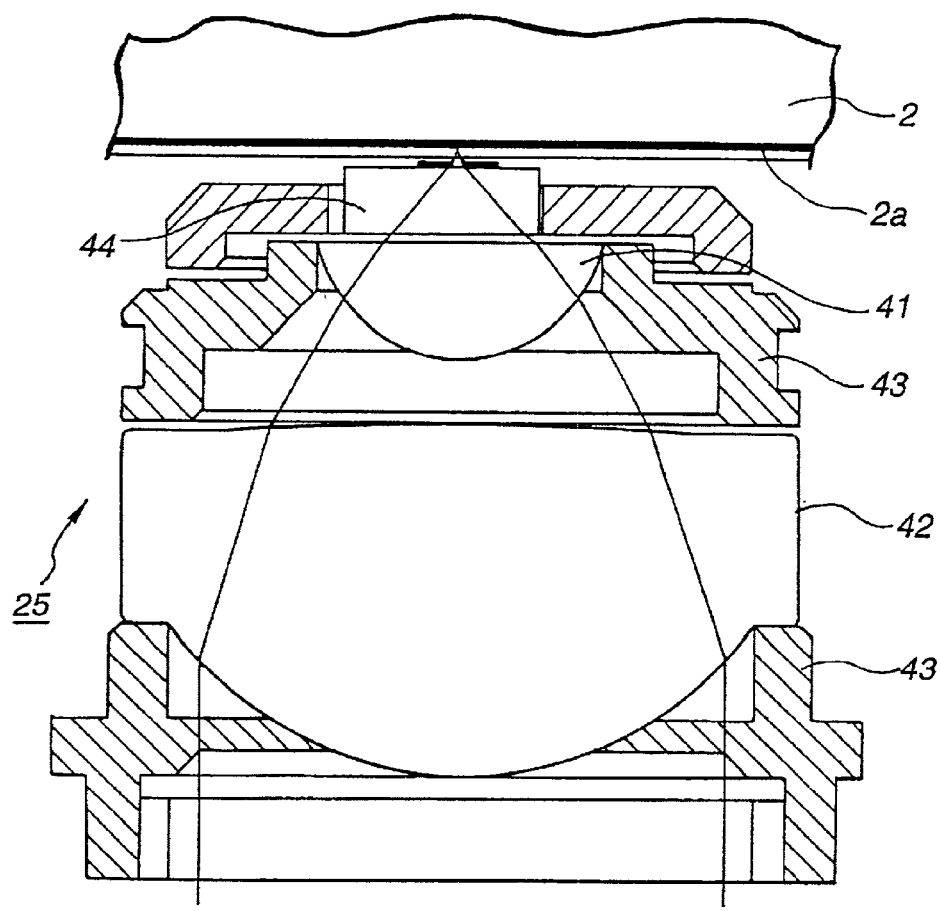
FIG. 6 is a longitudinal cross-sectional view showing an optical device embodying the present invention.

Referring to FIG. 6, the magneto-optical head unit 25 has two lenses on an optical path of the laser light transmitted through the first beam splitter 24. These two lenses make up an objective lens adapted for converging the laser light radiated from the semiconductor laser 21. In the following description, the lens of these two lenses which is arranged towards the magneto-optical disc 2 is termed a forward lens 41, while the other lens is termed a backward lens 42.

The forward lens 41 and the backward lens 42, molded to a preset shape from a blue-plate glass or a quartz plate, transparent to the laser light used, are each supported by a lens holder 43, and are moved in unison in a direction towards and away from and in a radial direction of the magneto-optical disc 2. The spherical shape of the forward lens 41 is optimized, depending on the shape or position of the backward lens 42, substrate thickness or the refractive index of the magneto-optical disc 2, so that the laser light illuminated on the photodetector recording layer will not be affected by the spherical aberration.

The forward lens 41 and the backward lens 42, each carried by the lens holder 43, is moved by the driving actuator 6 in unison in a radial direction of and in a direction towards and away from the magneto-optical disc 2, in order to effectuate tracking control and focussing control. In effectuating the focussing control, the forward lens 41 or the backward lens 42 is moved in a direction towards and away from the other lens to correct the spherical aberration.

The magneto-optical head unit 25 is provided with a coil supporting substrate 44 on the side of the forward lens 41 lying towards the magneto-optical disc.

This coil supporting substrate 44, molded as a flat plate from transparent members of, such as blue-plate glass, quartz glass or aluminum oxide, is arranged towards the magneto-optical disc 2 of the forward lens 41, as it is supported by the lens holder 44, in such a manner that the major surface of the substrate 44 will be substantially perpendicular to the optical axis of the laser light converged by the backward lens 42 and the forward lens 41, that is, in such a manner that the major surface of the substrate will be subsequently parallel to the photomagnetic recording layer 2a of the magneto-optical disc 2.

If the coil supporting substrate 44 is formed of, for example, aluminum oxide, higher in thermal conductivity than blue-plate glass or quartz glass, heat generated on heating the thin-film coil by the driving coil being fed through the thin film coil can be effectively propagated to the coil supporting substrate 44 to prevent rupture of the thin film coil or lowering of the efficiency of the generated magnetic field.

If aluminum oxide is used, its thermal conductivity (of the order of 21 W/m·K), is sufficient to permit propagation of heat generated in the thin film coil. It is noted that, as a member used for the coil supporting substrate 44, any suitable member may be used which has thermal conductivity of the same order as aluminum oxide.

Figure 7:
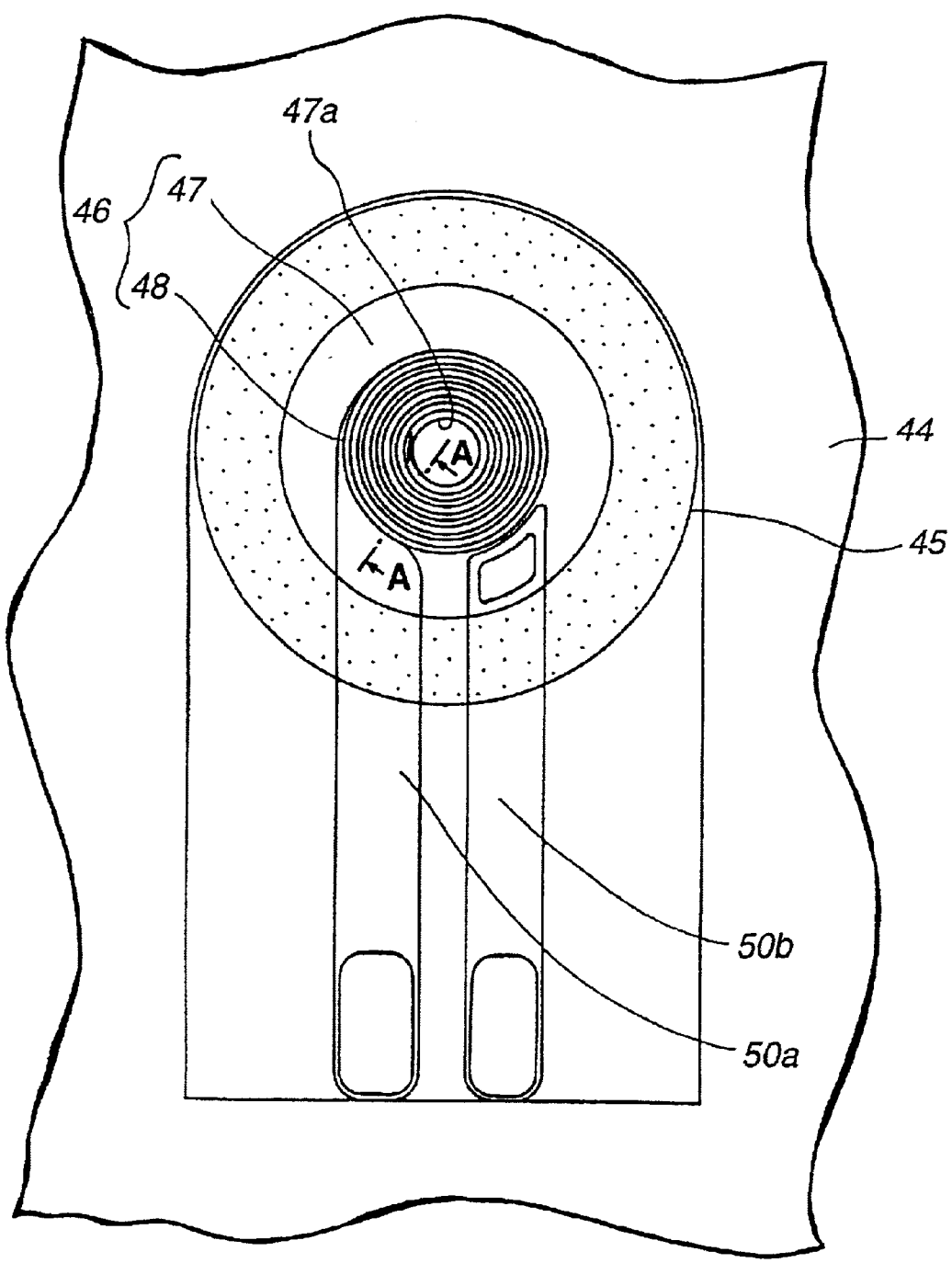
FIG. 7 is a plan view showing a coil.
Figure 8:
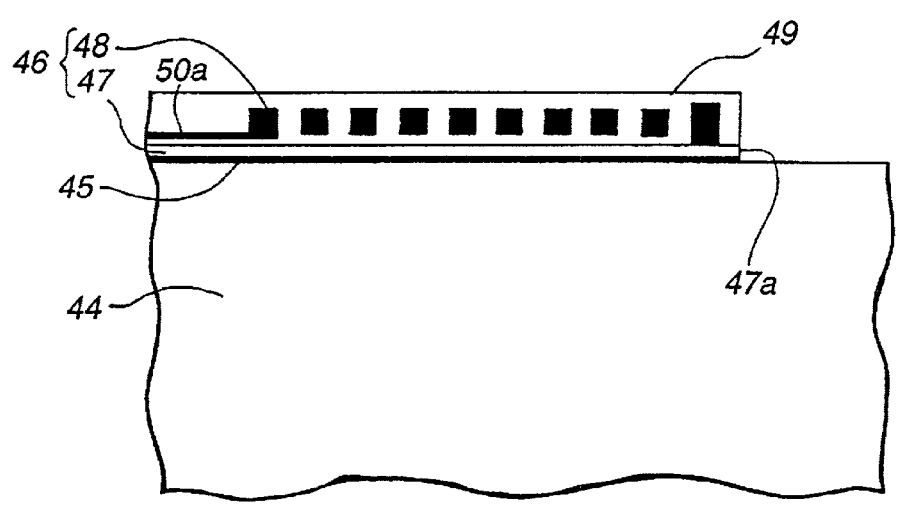
FIG. 8 is a longitudinal cross-sectional view, taken along line A—A in FIG. 4, showing the coil.

On the major surface of the coil supporting substrate 44 facing the magneto-optical disc 2, there is formed a magnetic field generating coil unit 46 via a transparent dielectric film 45 adapted for inhibiting reflection of the laser light transmitted through the coil supporting substrate 44, as shown in FIGS. 7 and 8.

The materials of the transparent dielectric film 45 may be enumerated by, for example, silicon oxide, tungsten oxide, magnesium fluoride and silicon nitride.

The coil unit 46 includes a magnetic core 47, formed via transparent dielectric film 45 on the major surface of the coil supporting substrate 44, and a spirally-shaped thin film coil 48 formed on this magnetic core 47. This coil unit 46 is improved in magnetic field efficiency by providing the magnetic core 47 in adjacency to the thin film coil 48.

As the materials for the magnetic core 47, a wide variety of materials may be used, such as Ni—Fe alloys, Co-based amorphous alloys, Fe—Al—Si alloys, laminated Fe—C Ni—Fe alloys, Fe—Ta—N alloy or Mn—Zn ferrite. These materials may be used alone or in combination. If the magnetic core 47 is formed of an electrically conductive material, the thin film coil 48 can be connected via this magnetic core 47 to one of the electrodes, it being unnecessary to provide a separate lead-out line for connecting the thin film coil 48 to one of the electrodes. Thus, if the magnetic core 47 is formed of an electrically conductive material, and the thin film coil 48 is connected via the magnetic core 47 to one of the electrodes, the coil unit 46 can be reduced in thickness to cope with the increased NA.

The material of the magnetic core 47 is formed, such as by sputtering, on the major surface of the coil supporting substrate 44 to a thickness of not less than 1 $\mu$m, and is molded by etching to a toroidal shape having a light-transmitting hole 47a of a predetermined diameter. The light-transmitting hole 47a of the magnetic core 47, set to a diameter of approximately 128 $\mu$m, is used to transmit the laser light converged by the backward lens 42 and the forward lens 41, as its beam diameter is controlled, and to illuminate the transmitted laser light on the photomagnetic recording layer 2a of the magneto-optical disc 2. The laser light converged by the backward lens 42 and the forward lens 41 and transmitted through the light-transmitting hole 47a of the magnetic core 47 has its portion towards its outer rim kicked by the magnetic core 47 so that it is illuminated on the photomagnetic recording layer 2a of the magneto-optical disc 2 with a predetermined beam diameter.

For improving adhesion of the magnetic core 47 to the coil supporting substrate 44, an adhesive layer, such as a Cr film, may be formed on the major surface of the coil supporting substrate 44, and the magnetic core 47 may then be formed via this adhesive layer on the coil supporting substrate 44.

The thin film coil 48, generating a magnetic field corresponding to the recording signals supplied from a preset device for applying the generated magnetic field on the laser light illuminating position of the photodetector recording layer 2a of the photodetector recording layer 2, is formed spirally on the magnetic core 47. The thin film coil 48 has a center hole of a predetermined diameter for appropriately transmitting the laser light transmitted through the light-transmitting hole 47a of the magnetic core 47.

The thin film coil 48 is formed by depositing a film of an electrically conductive material, such as one of Cu, Ag and Au or an alloy containing at least one of these metals, to a preset thickness on the magnetic core 47, and by etching this electrically conductive material to the shape of a helix having a center hole using a photolithographic technique.

This thin film coil 48 is embedded in an insulating layer 49 of an insulating material for protection. From the outer rim of the helix is pulled out an electrode 50a for supplying the driving current to the thin film coil 48.

If the magnetic core 47 of the thin film coil 48 is formed of an electrically conductive material, the inner rim of the helix is connected via this magnetic core 47 to the opposite side electrode 50b.

Since the spirally-shaped inner rim of the thin film coil 48 is connected via magnetic core 47 to an electrode 50b, there is on necessity of providing a separate lead-out line. Therefore, the thickness of the insulating layer 49, in which are buried the magnetic core 47 and the thin film coil 48, suffices as the thickness of the coil 46, such that it becomes possible to reduce the thickness of the coil unit 46.

The materials of the insulating layer 49 for protecting the thin film coil 48 may be exemplified by, for example, resist materials, polyimide or acrylic resins. The insulating layer 49 is provided with a center hole, depending on the shape of the thin film coil 48, such that the laser light converged by the backward lens 42 and the forward lens 41 traverses this center hole.

The thin film coil 48 is formed on the coil supporting substrate 44 so that it will be substantially parallel to the photomagnetic recording layer 2a of the magneto-optical disc 2. Thus, the direction of the current flowing in the thin film coil 48 is substantially parallel to the photomagnetic recording layer 2a of the magneto-optical disc 2, so that the thin film coil 48 generates a magnetic field substantially perpendicular to the photomagnetic recording layer 2a of the magneto-optical disc 2 to apply this magnetic field on the Photomagnetic recording layer 2a.

Figure 9:
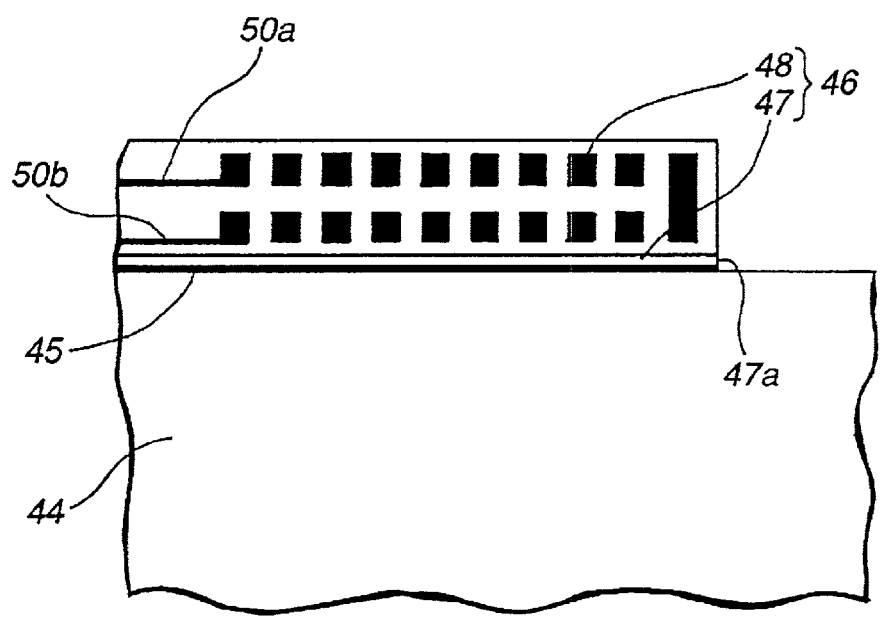
FIG. 9 is a longitudinal cross-sectional view showing a modified coil.
Figure 10:
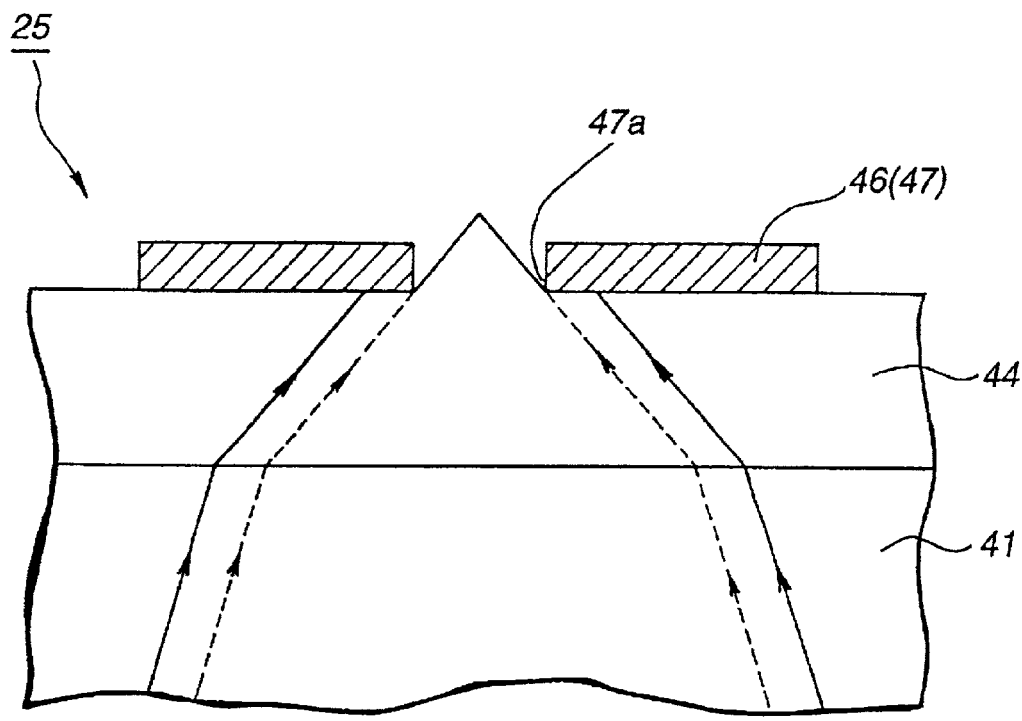
FIG. 10 is a schematic view for illustrating that the beam diameter of the laser light is determined when the laser light passes through the center hole of the coil.

Although the above description is made with reference to an embodiment in which the thin film coil 48 is formed by a single-layer coil, the thin film coil 48 used for the magneto-optical head unit 25 may also be of a double-layer structure of an upper layer coil 48a and a lower-layer coil 48b, each of which is buried in the insulating layer 49, as shown in FIG. 9.

In this case, a pair of electrodes 50a, 50b for supplying the driving current to the thin film coil 48 are led out from the outer rim of the helix of the upper layer coil 48a and the helix of the lower-layer coil 48b. The inner rim of the helix of the upper layer coil 48a and the inner rim of the helix of the lower-layer coil 48b are connected to each other for electrically interconnecting the upper layer coil 48a and the lower-layer coil 48b.

The above-described magneto-optical head unit 25 is designed so that the incident laser light is converged by the backward lens 42 and the forward lens 41 and so that the laser light converged by the backward lens 42 and the forward lens 41 will be transmitted through the center hole of the coil unit 46 so as to be illuminated on the Photomagnetic recording layer 2a of the magneto-optical disc 2a, as described above. With the present magneto-optical head unit 25, the beam diameter of the laser light is determined when the laser light converged by the backward lens 42 and the forward lens 41 is transmitted through the center hole of the coil unit 46, more specifically through the center hole 47a of the magnetic core 47. That is, the laser light converged by the backward lens 42 and the forward lens 41 has its portion towards its outer rim kicked by the magnetic core 47, with the center hole 47a of the magnetic core 47 as an aperture, when the laser light traverses the coil supporting substrate 44 to traverse the center hole 47a of the magnetic core 47 in a state in which the beam diameter is larger than the diameter of the center hole 47a of the magnetic core 47. The laser light traversing the center hole 47a of the magnetic core 47 has its beam diameter thus set and is illuminated in this state on the photomagnetic recording layer 2a of the magneto-optical disc 2.

Since the beam diameter of the laser light illuminated on the photomagnetic recording layer 2a of the magneto-optical disc 2 is set when the laser light traverses the center hole of the coil unit 46, more specifically through the center hole 47a of the magnetic core 47 of the coil unit 46, it is possible to reduce the variation in the beam diameter to approximately the range of tolerance even if the center of the laser light is deviated from the center shaft of the magneto-optical head unit 25 due to e.g., levelling down of the optical axis or assembling errors of the magneto-optical head unit 25.

Thus, with the present magneto-optical unit 25, there is not necessity of setting the diameter of the center hole of the coil unit 46 to larger values in consideration of leveling down of the optical axis or assembling errors of the magneto-optical head unit 25, such that the magnetic field can be generated efficiently with low power consumption, while the risk of rupture of the tracking yoke 46 can be minimized.

Although the foregoing description has been made of an embodiment in which the coil supporting substrate 44 is provided on the magneto-optical disc side of the forward lens 41 and the coil unit 46 is provided on the coil supporting substrate 44, the present invention is not limited to this specified embodiment. Thus, the coil unit 46 may also be directly provided on the circular flat portion 41a of the forward lens 41 without providing the coil supporting substrate 44.

Since the beam diameter of the laser light converged by the backward lens 42 and the forward lens 41 is similarly determined in this case by the center hole of the coil unit 46, the meritorious effect such as that described above can be achieved.

Although the foregoing description has been made of an embodiment in which the magnetic core 47 is formed on the coil supporting substrate 44 and the thin film coil 48 is formed on the magnetic core 47, the present invention is not limited to this specified embodiment. Thus, the thin film coil 48 may be formed on the coil supporting substrate 44 without interposition of the magnetic core 47. In this case, the beam diameter of the laser light illuminated on the photomagnetic recording layer 2a of the magneto-optical disc 2 is determined by the center hole of the insulating layer 49 protecting the thin film coil 48.

Although the foregoing description has been made of an embodiment in which the laser light converged by the backward lens 42 and the forward lens 41 is transmitted through the coil supporting substrate 44 and through the center hole of the coil unit 46 so as to be illuminated on the Photomagnetic recording layer 2a of the magneto-optical disc 2, the present invention is not limited to this embodiment. That is, the coil supporting substrate 44 may be provided with a through-hole traversed by the laser light so that the laser light converged by the backward lens 42 and the forward lens 41 will be transmitted through this through-hole and through the center hole of the coil unit 46 without being transmitted through the interior of the coil supporting substrate 44 so as to be illuminated on the photomagnetic recording layer 2a of the magneto-optical disc 2.

If the magneto-optical head unit is constructed as described above, it is possible to use a member not transparent to the laser light used may be used as a material for the coil supporting substrate 44 if the material used is of a high thermal conductivity.

If the magneto-optical head unit is constructed from a member not transparent to the laser light in use, the beam diameter of the laser light illuminated on the photomagnetic recording layer 2a of the magneto-optical disc 2 is determined when the laser light traverses the through-hole formed in the coil supporting substrate 44.

Since the coil unit 46 of the magneto-optical head unit 25 is provided on the coil supporting substrate 44 formed by a member of high thermal conductivity, heat generated on supplying the driving current to the thin film coil 48 is transmitted effectively to the coil supporting substrate 44 without being stored in the thin film coil 48.

Thus, with the present magneto-optical head unit 25, there is no risk of the generated magnetic field being lowered in efficiency by the heat of the thin film coil 48 especially for high modulation frequency, while there is no risk of damage, such as rupture, of the thin film coil 48.

Although the foregoing description has been made of the magneto-optical head unit 25 in which the coil supporting substrate 44 formed by the member of high thermal conductivity is arranged on the side of the forward lens 41 facing the magneto-optical disc 2, as the coil supporting substrate 44 is carried by the lens holder 43, and in which the coil unit 46 is provided on the coil supporting substrate 44, the coil supporting portion may be provided by forming a film of a high thermal conductivity material, such as AlO, by sputtering on the circular planar surface 41a of the forward lens 41, and the coil unit 46 may be formed on this coil supporting portion, for realization of comparable effects.

Also, the forward lens 41 may be formed by a member of high thermal conductivity material, such as AlO, without providing the coil supporting substrate 44, and the coil unit 46 may be formed on the circular planar surface 41a of the forward lens 41, for realizing similar effects.

Although the foregoing description has been made of an embodiment in which the magnetic core 47 is formed on the coil supporting substrate 44 and the thin film coil 48 is formed on this magnetic core 47, the present invention is not limited to this embodiment. Thus, the thin film coil 48 may be formed on the coil supporting substrate 44 without interposition of the magnetic core 47. In this case, it is the center hole of the insulating layer 49 protecting the thin film coil 48 that determines the beam diameter oft the light beam illuminated on the photomagnetic recording layer 2a of the magneto-optical disc 2.

In the above-described magneto-optical head unit 25, since the magnetic core 47 used for increasing the magnetic field efficiency is formed by an electrically conductive material, and the thin film coil 48 is connected to one of the electrodes via this magnetic core 47, the driving current can be supplied appropriately to the thin film coil 48 without providing separate lead-out lines.

Figure 11:
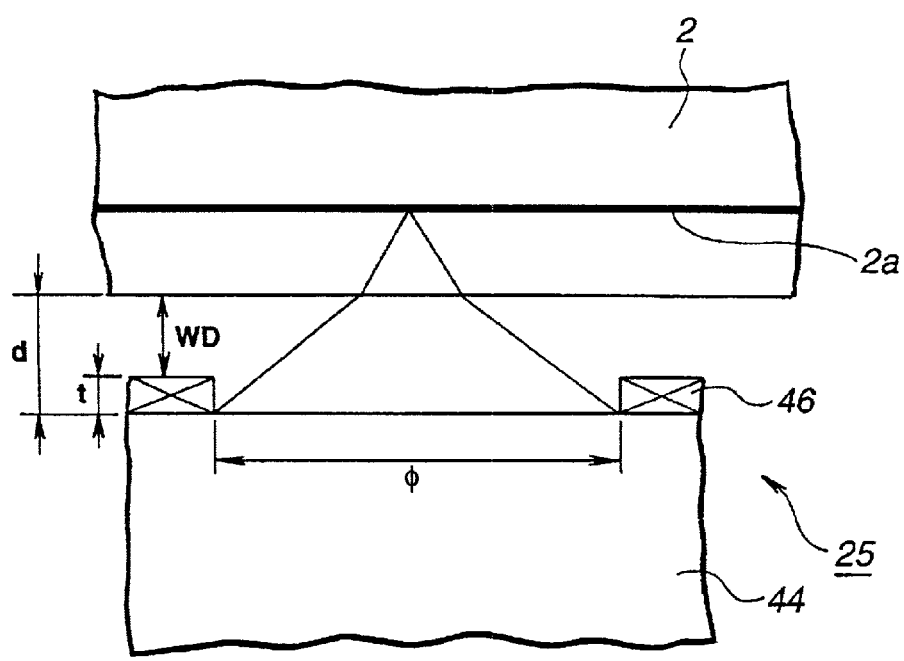
FIG. 11 is a schematic view for illustrating the relation between the thickness and the diameter of the center hole of the coil.
Figure 12:
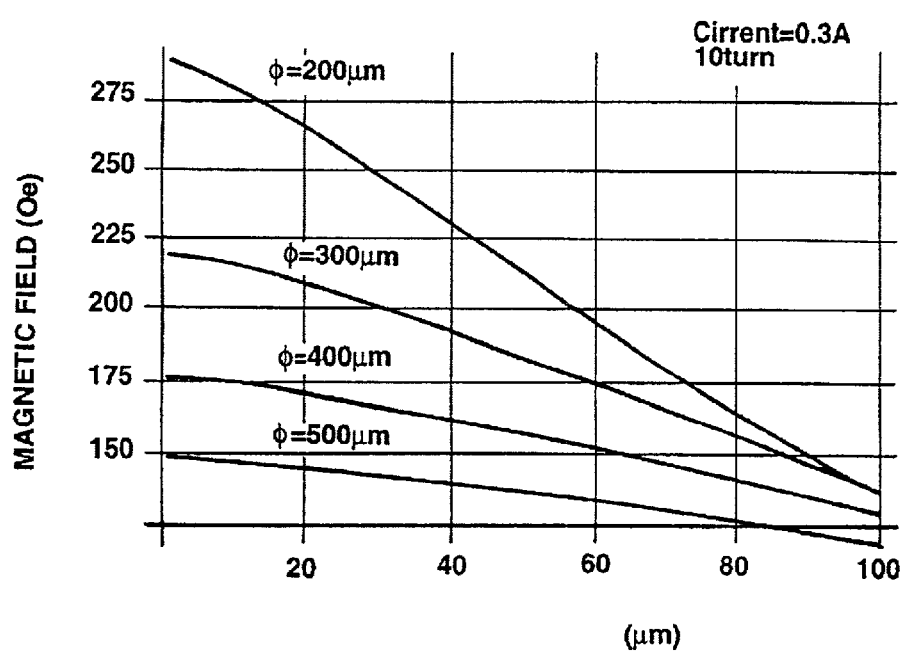
FIG. 12 is a graph showing magnetic field generating characteristics of an optical device according to the present invention as compared to those of a Comparative Example.

Therefore, with the present magneto-optical head unit 25, the coil unit 46 can be reduced in thickness, which is a merit in realizing the high NA. That is, if the thickness t of the coil unit 46 is set to a smaller value, the distance d between the major surface of the coil supporting substrate 44, as the coil unit forming surface, and the magneto-optical disc 2, can be reduced to a small magnitude, as the distance between the magneto-optical head unit 25 and the magneto-optical disc 2 (working distance WD) is set to a value which will evade collision between the magneto-optical head unit 25 and the magneto-optical disc 2, as shown in FIG. 11.

If the high NA is to be achieved with the magneto-optical head unit 25, the diameter φ of the center hole of the coil unit 46 depends on the distance d between the major surface of the coil supporting substrate 44 and the magneto-optical disc 2.

Thus, with the magneto-optical head unit 25, the high NA can be realized by reducing the thickness t of the coil unit 46 and the distance d between the major surface of the coil supporting substrate 44 and the magneto-optical disc 2, with the diameter φ of the center hole of the coil unit 46 being reduced.

With the magneto-optical head unit 25, an appropriate magnetic field can be applied across the optical head recording layer 2a of the magneto-optical disc 2 efficiently with a low power consumption, by setting the diameter φ of the coil unit 46 to a smaller value. Moreover, heat evolution in the thin film coil 48 can be reduced, while suppressing damage to the thin film coil 48, such as breakage.

Although the foregoing description has been made of an embodiment in which the coil supporting substrate 44 is provided on the forward lens 41 towards the magneto-optical disc 2, and the coil unit 46 is provided on the major surface of the coil supporting substrate 44, the present invention is not limited to this illustrative embodiment. For example, the coil unit 46 may be directly formed on the circular planar surface of the forward lens 41.

In this case, by connecting the thin film coil 48 via magnetic core 47 to one of the electrodes for reducing the thickness of the coil unit 46, the distance between the circular planar surface of the forward lens 41 and the magneto-optical disc 2 can be reduced for achieving the results similar to those of the previous embodiment.

The recording/reproducing operation of the above-described optical disc device 1 will be hereinafter explained.

For recording preset data on the magneto-optical disc 2 by the optical disc device 1, the magneto-optical disc 2, carrying the spindle motor 3, is run in rotation, as the laser light is emitted from the semiconductor laser 21 of the head 4.

The laser light radiated from the semiconductor laser 21 falls on the magneto-optical head unit 25 via collimator lens 22, shaping lens 23 and the first beam splitter 24. The laser light incident on the magneto-optical head unit 25 is converged by the backward lens 42 and the forward lens 41 of the magneto-optical head unit 25 to traverse the center hole of the coil unit 46. At this time, the beam diameter of the laser light is set by the outer periphery of the laser light being partially kicked by the coil unit 46 with the center hole of the coil unit as an aperture. The laser light traversing the center hole of the coil unit 46 is illuminated on the photomagnetic recording layer 2a of the magneto-optical disc 2.

The optical disc device 1 radiates the laser light on the photomagnetic recording layer 2a of the magneto-optical disc 2 to raise the temperature of the magnetic material irradiated with the laser light to not lower than the Curie temperature or compensation temperature, with the laser light as the heat source, in order to demagnetize the heated portion.

If, in the optical disc device 1, recording signals modulated in keeping with the recording data are sent to the m25 via amplifier 36, the driving current is sent via the magnetic core 47 to the thin film coil 48, which then generates the magnetic field proportionate to the recording signals. This magnetic field is applied to a portion of the photomagnetic recording layer 2a of the magneto-optical disc 2 illuminated by the laser light.

In this manner, the optical disc device 1 records preset data (recording signals) on the magneto-optical disc 2. During this recording operation, any heat generated in the thin film coil 48 is effectively propagated to and absorbed by the coil supporting substrate 44. Meanwhile, the optical disc device 1 executes the focussing control and the tracking control during the recording operation, as during the reproducing operation, which will be explained subsequently.

The optical disc device 1 rotationally drives the magneto-optical disc 2 carrying the spindle motor 3, during readout of data recorded on the magneto-optical disc 2, as during the recording operation. Simultaneously, the laser light is emitted from the semiconductor laser 21 of the head 4.

The laser light emitted by the semiconductor laser 21 falls on the magneto-optical head unit 25 via collimator lens 22, shaping lens 23 and the first beam splitter 24 to the magneto-optical head unit 25. The laser light, thus incident on the magneto-optical head unit 25, is converged by the backward lens 42 and the forward lens 41 of the magneto-optical head unit 25 to traverse the center hole of the coil unit 46. At this time, the outer peripheral side of the laser light is partially kicked by the coil unit 46, with the center hole of the coil unit 46 as an aperture, so that the beam diameter is determined. The laser light traversing the center hole of the coil unit 46 is illuminated on the photomagnetic recording layer 2a of the magneto-optical disc 2.

The return light, reflected by the photomagnetic recording layer 2a, falls on the second photodetector 33 and the third photodetector 34 via second beam splitter 26, half wave plate 30, second converging lens 31 and the third beam splitter 32 for detection. The polarization plane of the return light from the photomagnetic recording layer 2a is rotated in mutually opposite directions depending on the direction of magnetization of the photomagnetic recording layer 2a (corresponding to the values of the recorded data) under the Kerr effect. The return light from the photomagnetic recording layer 2a falls on the second photodetector 33 and the third photodetector 34 via third beam splitter 32. This change in the rotation angle (Kerr rotation angle) between the plane of polarization and the plane of polarization of light illuminated on the photomagnetic recording layer 2a is transformed into change in light intensity which is detected.

The second photodetector 33 and the third photodetector 34 output electrical signals corresponding to the intensity of the incident return light to the differential amplifier 35, which then computes the difference between the outputs of the second and third photodetectors 33, 34 to output the difference as a MO playback signal.

The return light reflected by the photomagnetic recording layer 2a is partially reflected by the second beam splitter 26 so as to fall on the first photodetector 29 via the first converging lens 27 and the cylindrical lens 28.

The first photodetector 29 converts the incident return light into electrical signals which are sent via amplifier 7 of the control signal generator 5 to the focussing matrix circuit 8 and to the tracking matrix circuit 11.

The focussing matrix circuit 8 and the tracking matrix circuit 11 generate focussing error signals and the tracking error signals based on the converted electrical signals to send the focussing error signals and the tracking error signals via amplifiers 10, 13 to the driving actuator 6.

In keeping with these focussing error signals and tracking error signals, the driving actuator 6 causes movement of the magneto-optical head unit 25 in a direction in and out of contact with the magneto-optical disc 2 to effectuate focussing control and tracking control.

The magneto-optical head unit 25 used in the optical disc device 1 is configured so that the light emitted by the semiconductor laser 21 is converged by the backward lens 42 and the forward lens 41 and the laser light thus converged traverses the center hole of the coil unit so as to be illuminated on the photomagnetic recording layer 2a of the magneto-optical disc 2. With the magneto-optical head unit 25, the center hole of the coil unit 46 operates as an aperture to control the beam diameter of the transmitted laser light.

Thus, the laser light illuminated on the photomagnetic recording layer 2a of the magneto-optical disc 2 has its beam diameter set when it is transmitted through the center hole of the coil unit 46 of the magneto-optical head unit 25.

Thus, with the optical disc device 1 employing the magneto-optical head unit 25, variation in the beam diameter can be reduced to be within the allowance range, without setting the diameter of the center hole of the coil unit 46 of the magneto-optical head unit 25, even if the center of the laser light is deviated from the center axis of the magneto-optical head unit 25 due to levelling of the optical axis or the assembling errors in the magneto-optical head unit 25, thus efficiently generating the magnetic field with low power consumption to effectuate appropriate recording while suppressing damages to the thin film coil 48, such as rupture.

Moreover, since the coil unit 46 of the magneto-optical head unit 25 used in the optical disc device 1 is provided on the coil supporting substrate 44 formed by a member of a high thermal conductivity, any heat generated on supplying the driving current to the driving coil 48 is effectively transmitted to the coil supporting substrate 44 without accumulation in the thin film coil 48.

Thus, with the optical disc device 1 employing the magneto-optical head unit 25, recording can be made appropriately especially for high modulation frequency without lowering the efficiency of the generated magnetic field due to heat in the thin film coil 48, while suppressing damages of the thin film coil 48, such as rupture.

In addition, the magnetic core 47 of the magneto-optical head unit 25 of the optical disc device 1, used for improving the magnetic field efficiency, is formed by an electrically conductive material, and the thin film coil 48 is connected via magnetic core 47 to one of the electrodes, it is possible to reduce the thickness of the coil unit 46 and to reduce the diameter of the center hole of the coil unit 46 while realizing high NA.

Therefore, the optical disc 1, employing the magneto-optical head unit 25, can perform appropriate recording by efficiently applying the magnetic field to the photomagnetic recording layer 2a of the magneto-optical recording medium 2 with low power consumption, while suppressing damages, such as breakage, of the thin film coil 48.

For verifying the meritorious effect of the present invention, an optical device (magneto-optical head unit) in which the diameter φ of the center hole of the coil unit was set to 200 μm and the beam diameter of the light beam was determined by the center hole of the coil unit, was prepared, and playback characteristics of the optical device used in an optical disc device were evaluated. Also, the characteristics of the generated magnetic field of this optical disc device were evaluated, using the optical devices, in which the diameter φ of the center hole of the coil unit was set to 300 μm, 400 μm and to 500 μm.

Also, an optical device for photomagnetic recording (magneto-optical head unit) in which the coil supporting substrate was prepared using aluminum oxide was fabricated, and was used in an optical disc device to evaluate playback characteristics of the optical device used in the optical disc device. The temperature rising characteristics of the optical device were evaluated using, as an object for comparison, an optical device the coil supporting substrate of which was prepared using blue-plate glass.

Fabrication of Optical Device

On an aluminum oxide substrate, serving as a coil supporting substrate of a preset thickness, a silicon oxide film for preventing reflection of the laser light incident on the optical device was formed. Also, on the aluminum oxide substrate, on which was formed a silicon oxide film, CoPdZr as a material of the magnetic core was formed to a thickness of approximately 2.5 μg/m by sputtering with interposition of a Cr film operating as an adhesive layer.

By the etching process, a CoPdZr film was formed to a toroidal shape having a center hole. The diameter of the center hole of the magnetic core was set to approximately 128 μm. This value corresponds to NA approximately equal to 0.85 under an environment of the thickness of the cover glass of the magneto-optical disc and the distance between the magneto-optical disc facing surface of the coil supporting substrate and the magneto-optical disc surface of approximately 30 μm.

On the magnetic core was plated Cu as a thin film coil material. The Cu film was etched to a helix, having a center hole, using the photolithographic technique, to produce a thin film coil having a center hole. The inner periphery of the helix of the thin film coil was connected to the magnetic core so that the thin film coil was connected to one of the electrodes via this magnetic core.

The aluminum oxide substrate, carrying the magnetic core and the thin film coil, was cut to a preset size and mounted on the lens holder along with the forward lens and the backward lens. The respective components were adjusted to tilt, eccentricity and aberration which will give the minimum aberration.

In this manner, the optical components having the coil units with the center hole diameter φ of 200 μm, 300 μm, 400 μm and 500 μm were prepared.

Evaluation

The optical devices, thus prepared, were loaded on an optical disc device, on which a 10 Gbyte optical disc ROM, with a track pitch of 0.5 μm and a pit length of 0.17 μm/bit, was reproduced. It was found that sufficient reproducing characteristics were obtained, with the jitter being approximately 7%.

The magnetic field generated by the optical device, prepared as described above, was measured, as the measurement position was changed, under a condition of constant current consumption. It was found that the magnetic field generating characteristics were better the smaller the diameter of the center hole of the coil unit and that, in particular, the optical device having magnetic field generating characteristics set to 200 μm was significantly improved in the magnetic field generating characteristics over those of the Comparative Examples having magnetic field generating characteristics set to 300 μm, 400 μm and 500 μm.

That is, for obtaining satisfactory magnetic field generating characteristics, the diameter of the center hole of the coil unit is desirably set to a small value. By applying the present invention, the diameter of the center hole of the coil unit can easily be set to a smaller value.

Figure 13:
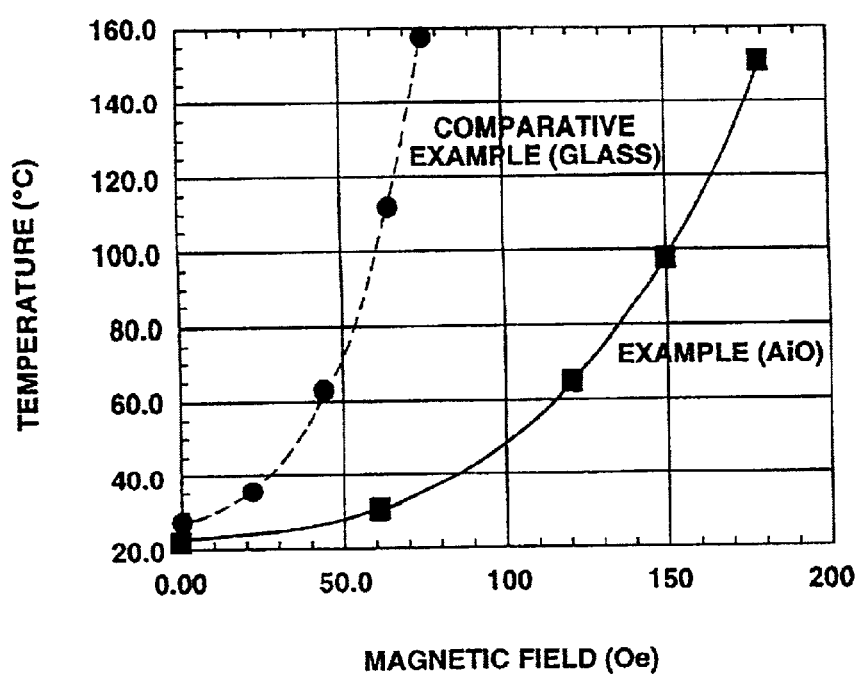
FIG. 13 is a graph showing temperature rising characteristics of an optical device according to the present invention as compared to those of a Comparative Example.

In addition, it has been found that, as shown in FIG. 13, temperature increase can be suppressed significantly as compared to the case of using the blue-plate glass for the coil substrate (Comparative Examples), as demonstrated by measurement of temperature increase that occurred in case the current magnitude was changed to vary the generated magnetic field.

What is claimed is:

1. An optical device comprising:
   light converging means, said light converging means converging light onto a photomagnetic recording layer of an optical recording medium;
   magnetic field generating means between said light converging means and said optical recording medium,
      said magnetic field generating means having a light transmitting center hole, said light transmitting center hole having a center hole diameter,
      said light incident upon said magnetic field generating means having a beam diameter greater than said center hole diameter,
      said light passing through said light transmitting center hole having a beam diameter equal to said center hole diameter.

2. The optical device according to claim 1 further comprising:
   a light source for radiating said light towards said photomagnetic recording layer.

3. The optical device according to claim 1 wherein a beam diameter of light illuminated on said photomagnetic recording layer is controlled by said light transmitting center hole.

4. The optical device according to claim 1 wherein said center hole diameter is not larger than 200 μm.

5. The optical device according to claim 1 wherein said optical device performs photomagnetic recording.

6. The optical device according to claim 1 wherein said magnetic field generating means applies a magnetic field onto said photomagnetic recording layer.

7. The optical device according to claim 1 wherein said magnetic field generating means has a front side and a back side,
   said front side being between said light converging means and said optical recording medium,
   said back side being between said light converging means and said front side,
   said light incident upon said back side having a beam diameter greater than said center hole diameter.

8. The optical device according to claim 1 wherein said light transmitting center hole is formed in a magnetic core.

9. The optical device according to claim 1 further comprising:
   a supporting substrate between said light converging means and said optical recording medium, said supporting substrate being separate and distinct from said light converging means, said supporting substrate formed of a material transparent to said light, said light being transmitted through said material.

10. The optical device according to claim 9 wherein said magnetic field generating means is on said supporting substrate.

11. The optical device according to claim 9 wherein an adhesive layer is between said supporting substrate and said magnetic field generating means.

12. The optical device according to claim 11 wherein said adhesive layer includes chromium.

13. The optical device according to claim 9 wherein said material propagates heat generated within said magnetic field generating means.

14. The optical device according to claim 9 wherein said magnetic field generating means is between said supporting substrate and said optical recording medium.

15. The optical device according to claim 9 wherein said material is higher in thermal conductivity than said light converging means.

16. The optical device according to claim 15 wherein said material has a thermal conductivity of the same order as aluminum oxide.

17. The optical device according to claim 15 wherein said material is aluminum oxide.

18. The optical device according to claim 1 wherein said magnetic field generating means includes a transparent dielectric film, a coil unit, and an insulating layer.

19. The optical device according to claim 18 wherein said transparent dielectric film is adjacent said supporting substrate, said transparent dielectric film inhibiting reflection of said light incident upon said magnetic field generating means.

20. The optical device according to claim 19 wherein said transparent dielectric film comprises silicon oxide, tungsten oxide, magnesium fluoride, or silicon nitride.

21. The optical device according to claim 20 wherein said magnetic core is adjacent said transparent dielectric film.

22. The optical device according to claim 18 wherein said coil unit is a magnetic core and a thin film coil.

23. The optical device according to claim 22 wherein said magnetic core comprises a Ni—Fe alloy, Co-based amorphous alloy, Fe—Al—Si alloy, laminated Fe—C Ni—Fe alloy, Fe—Ta—N alloy, or Mn—Zn ferrite.

24. The optical device according to claim 22 wherein said magnetic core has a thickness of not less than 1 μm.

25. The optical device according to claim 22 wherein said thin film coil is adjacent said magnetic core.

26. The optical device according to claim 22 wherein said thin film coil is embedded in an insulating layer, said thin film coil being connecting to said magnetic core via an electrode.

27. The optical device according to claim 26 wherein said thin film coil has a spiral-shape.

28. The optical device according to claim 26 wherein said thin film coil is either a single-layer coil or a double-layer coil.

29. The optical device for photomagnetic recording according to claim 1 wherein said light converging means includes a plurality of lenses arranged along an optical path of said light.

30. The optical device according to claim 1 wherein said light converging means includes a forward lens and a backward lens.

31. The optical device according to claim 30 wherein said forward lens and said backward lens are molded to a preset shape from a blue-plate glass or a quartz plate.

32. The optical device according to claim 30 wherein a supporting substrate is between said forward lens and said optical recording medium.

33. The optical device according to claim 30 wherein said forward lens and said backward lens are moved towards and away from each other.

34. The optical device according to claim 30 wherein said forward lens and said backward lens are moved in unison to effectuate tracking control and focusing control.

35. The optical device according to claim 30 wherein said forward lens and said backward lens are each carried by a lens holder which is moved by a driving actuator in unison in a radial direction and also both towards and away from optical recording medium.

36. A recording and/or reproducing apparatus comprising:
rotationally driven means, a light source, an optical device, a light receiving means, and a signal processing circuit;
said rotationally driven means rotationally driving an optical recording medium having a photomagnetic recording layer,
said light source for radiating the light towards a photomagnetic recording layer of said optical recording medium;
said optical device arranged on the optical path of the light radiated from said light source, said optical device including light converging means and magnetic field generating means,
said light converging means converging light onto a photomagnetic recording layer of an optical recording medium;
said magnetic field generating means being between said light converging means and said optical recording medium,
said magnetic field generating means having a light transmitting center hole, said light transmitting center hole having a center hole diameter,
said light incident upon said magnetic field generating means having a beam diameter greater than said center hole diameter,
said light passing through said light transmitting center hole having a beam diameter equal to said center hole diameter;
said light receiving means receiving said light reflected back from said photomagnetic recording medium as return light;
said signal processing circuit generating preset signals based on said return light.

* * * * *

UNITED STATES PATENT AND TRADEMARK OFFICE
CERTIFICATE OF CORRECTION

PATENT NO. : 6,922,376 B1  Page 1 of 1
APPLICATION NO. : 09/173747
DATED : July 26, 2005
INVENTOR(S) : Ariyoshi Nakaoki et al.

It is certified that error appears in the above-identified patent and that said Letters Patent is hereby corrected as shown below:

Title Page:
Item (54) should be read as follows:
-- SIL MAGNETO-OPTIC TRANSDUCER HAVING THIN FILM MAGNETIC COIL AND HOLED MAGNETIC CORE --.

Signed and Sealed this

Tenth Day of July, 2007

JON W. DUDAS
*Director of the United States Patent and Trademark Office*